MULTIRANK MULTISTAGE SHIFT REGISTER

Filed Oct. 22, 1965

INVENTORS.
ROBERT W. BOWER,
RICHARD F. STEWART,
BY
J. K. Haskell
ATTORNEY.

United States Patent Office 3,421,092

Patented Jan. 7, 1969

3,421,092

MULTIRANK MULTISTAGE SHIFT REGISTER

Robert W. Bower, Palos Verdes, and Richard F. Stewart, Los Angeles, Calif., assignors to Hughes Aircraft Company, Culver City, Calif., a corporation of Delaware Filed Oct. 22, 1965, Ser. No. 502,225

U.S. Cl. 328—37 22 Claims

Int. Cl. H03k *19/00;* H03k *19/34;* H03k *19/36*

ABSTRACT OF THE DISCLOSURE

A dual rank multistage shift register including a control circuit and a pulse segmenting circuit. The control circuit is coupled to each stage of at least one rank of the shift register and responds to clock pulses, data signals and command signals for synchronously setting the ranks of the register so that all stages of the same rank are set to the same state. The pulse segmenting circuit includes at least a first segmented line and a first complementary line with the lines being selectively coupled to each stage of at least one rank of the register. The pulse segmenting circuit responds to command signals and at least one of the clock pulses for segmenting at least one of the clock pulses to provide on the first segmented line and the first complementary line one of the clock pulses and the complement thereof, respectively, so as to set the stages in at least one rank to selected states.

This invention relates to shift registers and, more particularly, to improvements in multirank serial shift registers.

Multistage shift registers of the serial type into which binary digits or bits are serially introduced to propagate therethrough and exit through an output terminal are extensively used in presently known data processing systems. When operated in an open loop, namely the input and output terminals are not interconnected, the shift register acts as a delay line providing a time delay which is equal to the number of stages multiplied by the time required for each bit to advance by one stage. Clock pulses are provided to advance the bits in the register. By interconnecting the output and input terminals, known as closed loop operation, the shift register acts as a circulating bit memory.

In multirank shift registers such as the dual rank type, each stage comprises of an upper rank and a lower rank with the bits being transferred during one clock pulse from the upper rank to the lower rank within each stage and during a second clock pulse from the lower rank of each stage to the upper rank of the succeeding stage. Thus a dual rank shift register requires a two phase clocking sequence.

Though serial shift registers are extensively used in most cases to great advantage, the fact that the bits must be serially introduced into a serial register often greatly complicates the circuitry in which the register is incorporated. Also, the serial operation greatly increases the time required to set the register so as to store a selected multibit number.

This is particularly the case when serial shift registers are incorporated in special purpose computers. In such computers, situations arise where it is necessary that certain registers contain preselected multibit numbers. However, since such numbers can only be introduced serially, it is necessary to associate the registers with memory circuits and other signal-rerouting circuits in order to properly introduce the desired numbers in the desired registers, an operation which is very time consuming. Thus, a need exists for a shift register which is, though operable as a conventional shift register, also adapted to be set in a selected condition by setting all the stages in parallel to store predetermined bits comprising a predetermined multibit number.

Accordingly, it is an object of the present invention to provide a novel serial shift register.

Another object is to provide a new serial shift register that is selectively operable in parallel to store a selected multibit number.

A further object is to provide a new multirank serial shift register.

Yet another object is the provision of a multirank serial shift register which is adapted to be operated in parallel to store a predetermined multibit number.

Still a further object is the provision of a new dual rank serial register which in addition to being operable in a conventional mode may also be set in parallel to store a predetermined multibit number.

Yet a further object is to provide a new dual rank multistage serial shift register which is operable in a conventional mode but in addition the lower or upper ranks of the multistages may be set in parallel to store one of a pair of selected multibit numbers.

And yet another object is to provide an integrated circuit serial shift register which operates in a conventional serial mode as well as being operable in parallel to store one of a selected number of multibit numbers.

These and other objects are achieved by providing a multirank multistage serial shift register into which at least one of the clock pulse lines supplying clock pulses to the various ranks is segmented. The register is responsive to an initiating signal which causes the clock pulse to propagate through one of the segmented lines and its complement through the other segmented line. Depending on the setting of the particular rank in each stage associated with the segmented clock pulse line, a binary "zero" ("0") or binary "one" ("1") is stored in the particular rank. The storing occurs in parallel so that depending on the settings of the various stages, a selected multibit number may be stored in the register.

For example, a dual rank multistage serial shift register conventionally incorporates two clock pulse lines, one of which is connected to the upper rank of each stage and the other of which is connected to the lower rank of each stage. In accordance with the teachings disclosed herein, one or both of the lines may be segmented so that each stage conventionally connected to the particular segmented line may be supplied with the clock pulse which conventionally propagates therethrough or with its complement. As a result, each stage is either set to store a "zero" or a "one."

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
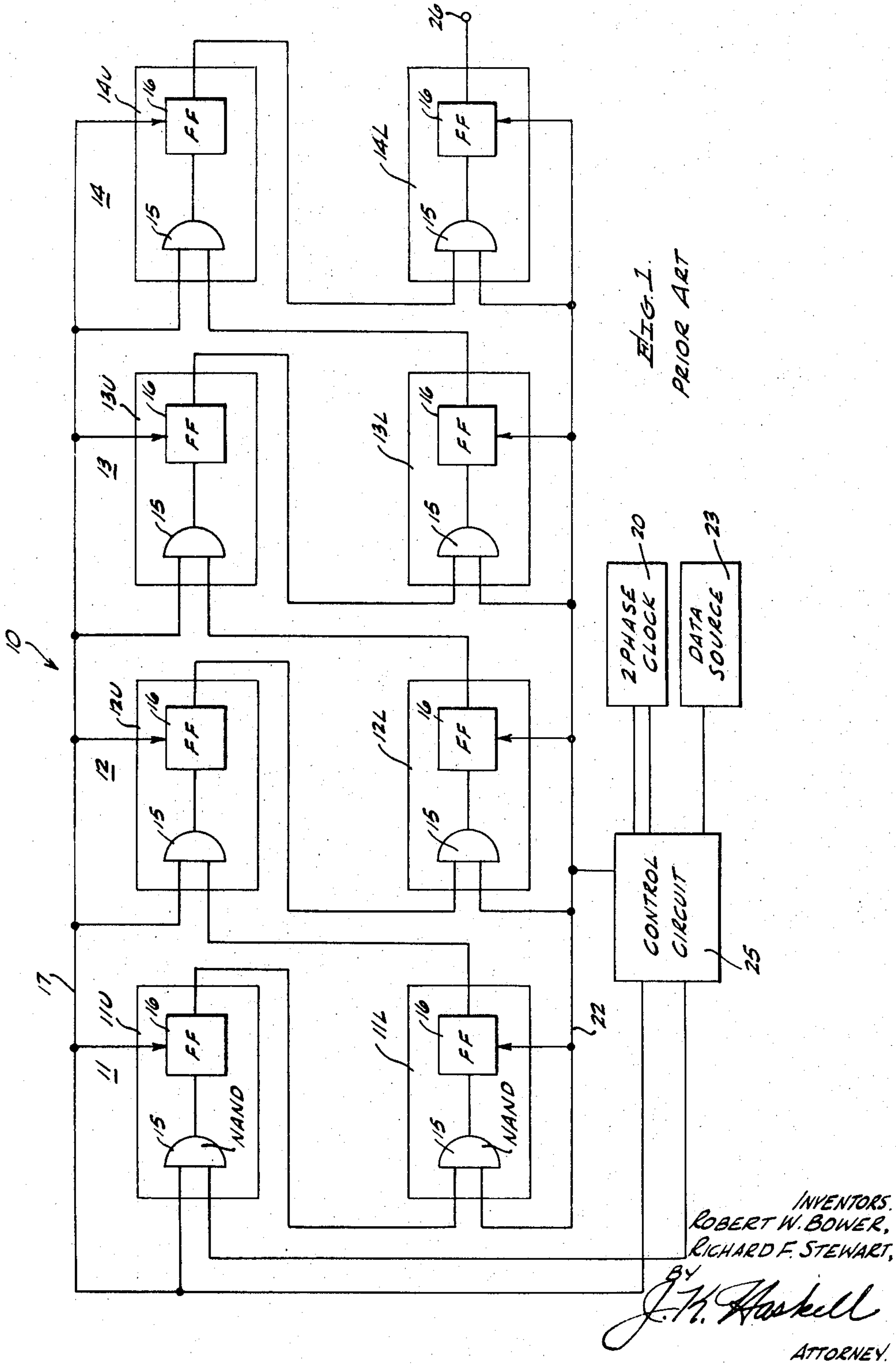
FIG. 1 PRIOR ART
FIGURE 1 is a schematic block diagram of a serial shift register known in the prior art as a dual rank type and which is illustrated for explaining the improvements of the present invention over the prior art.
Figure 4A:
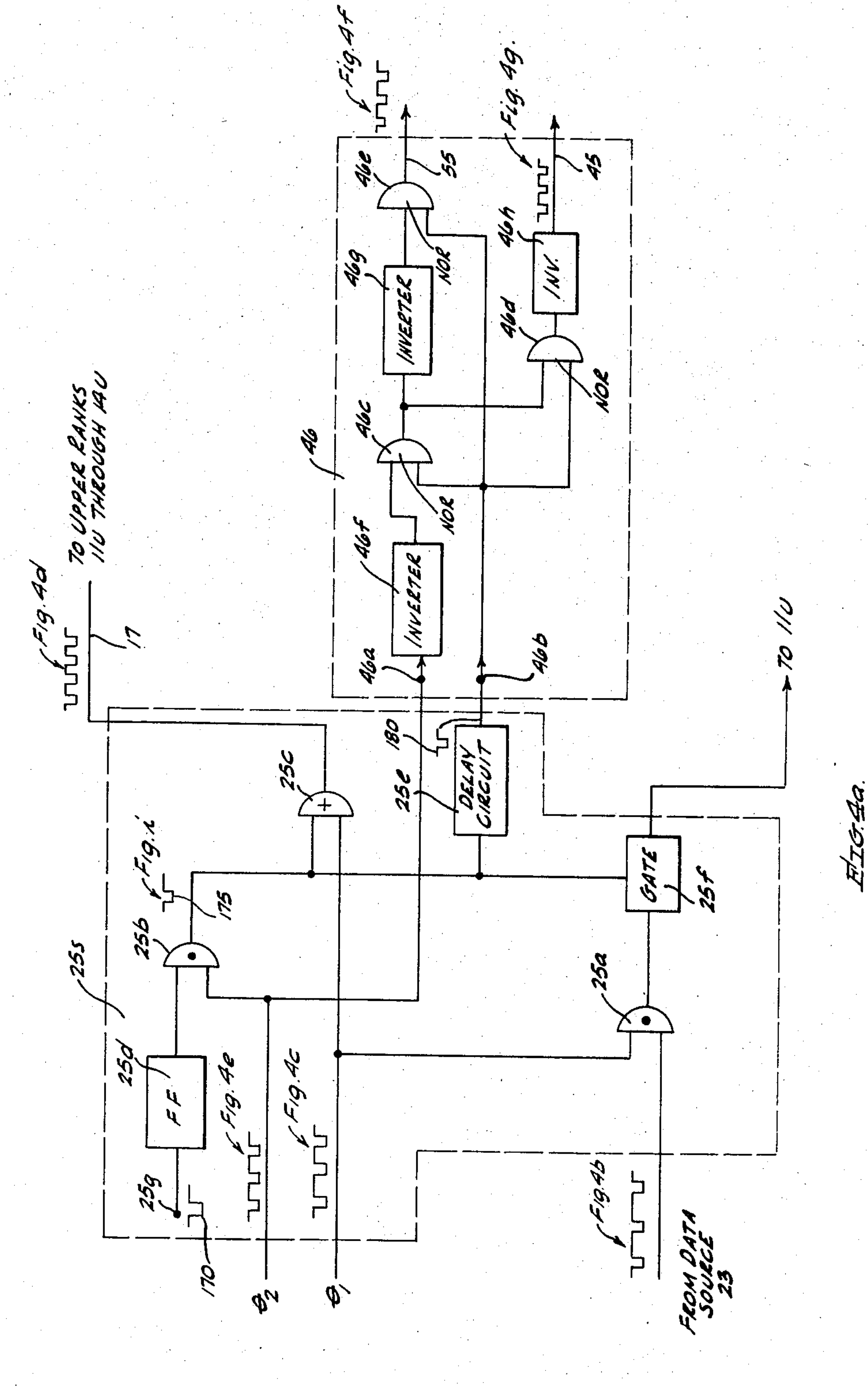
FIGURE 4(*a*) is a schematic block diagram of a portion of the circuitry shown in FIGURE 3.
Figures 4B, 4C, 4D, 4E, 4F, 4G, 4H, 4I, 4J:
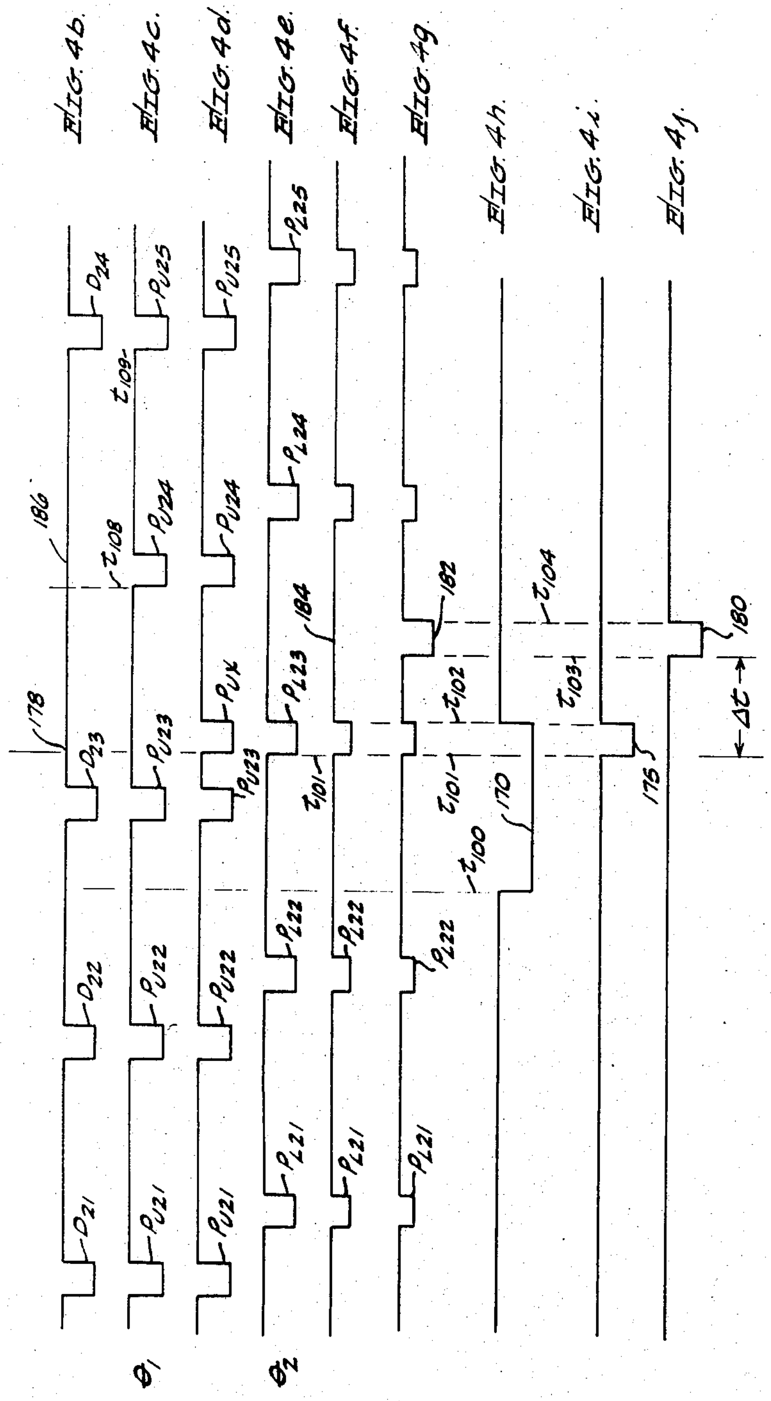
Figure 5:
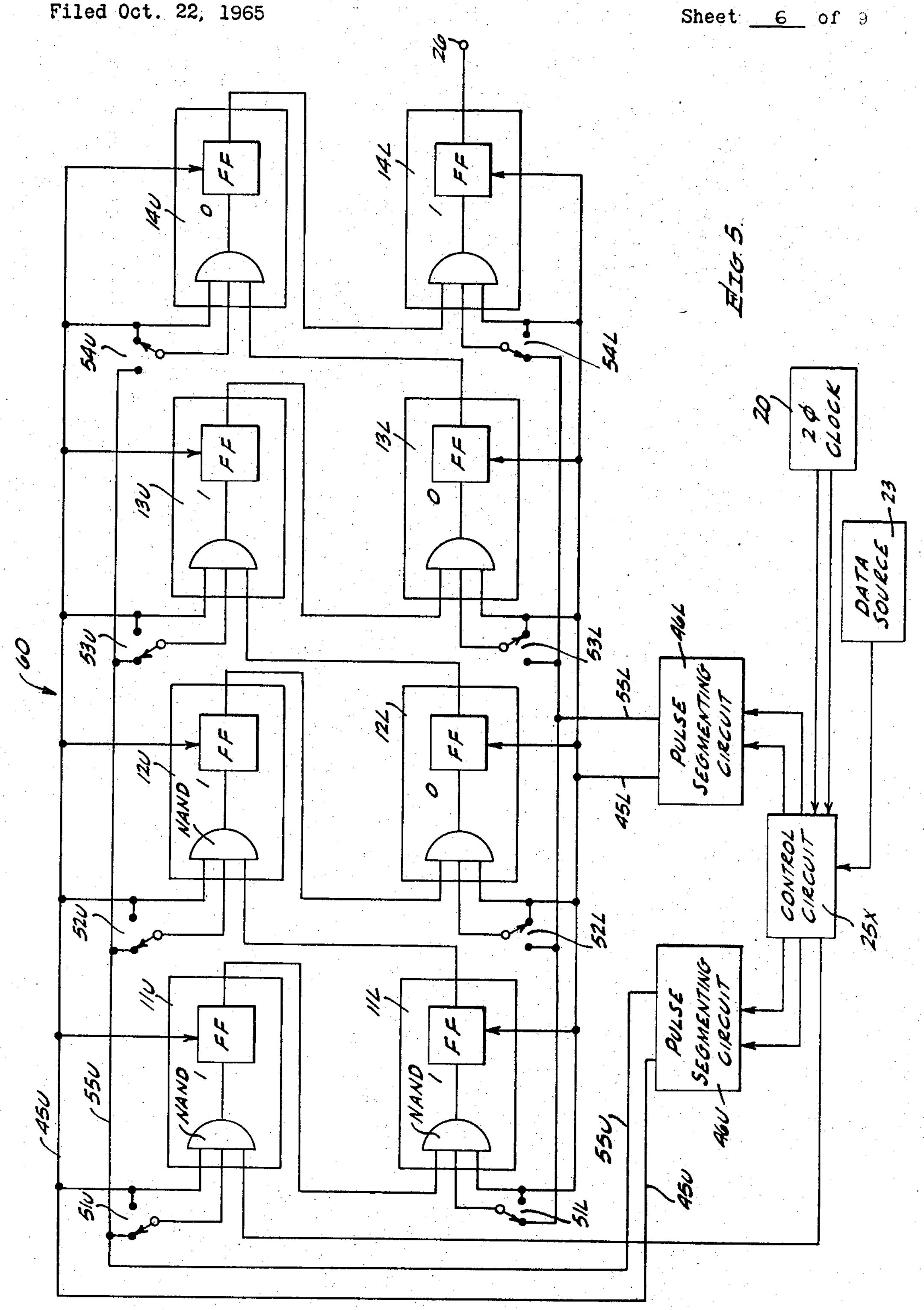
Figures 6, 7:
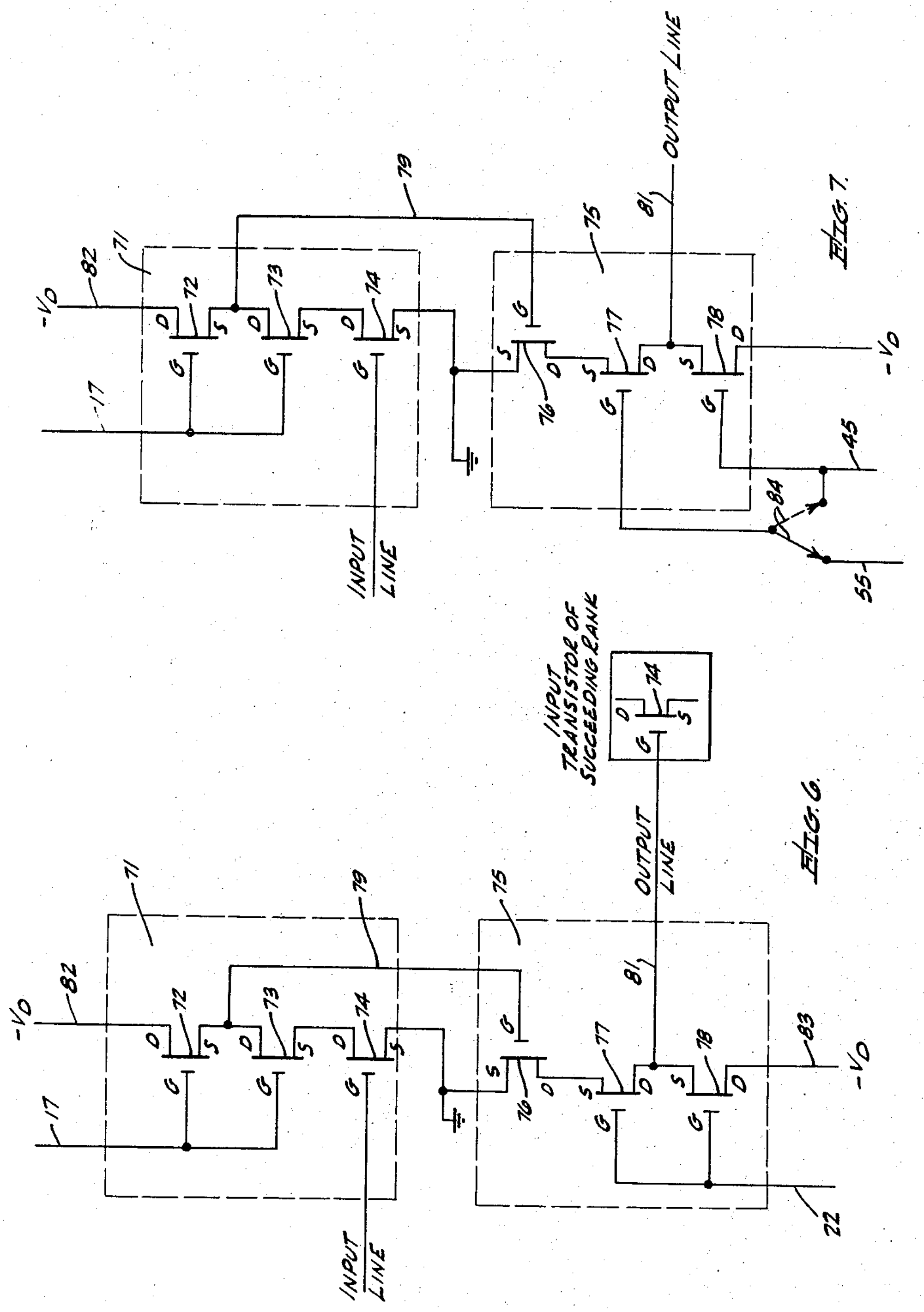
Figure 8:
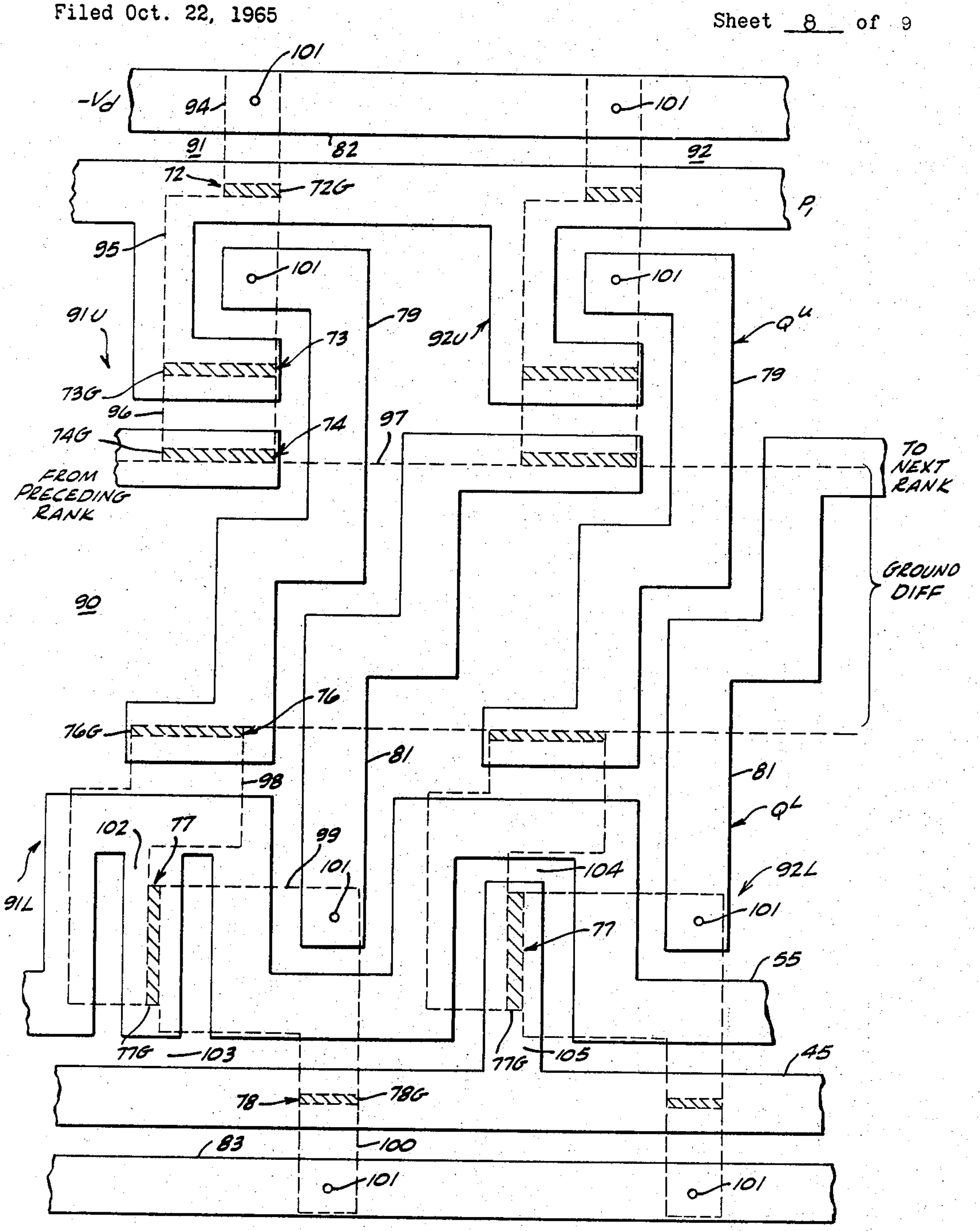
Figure 9:
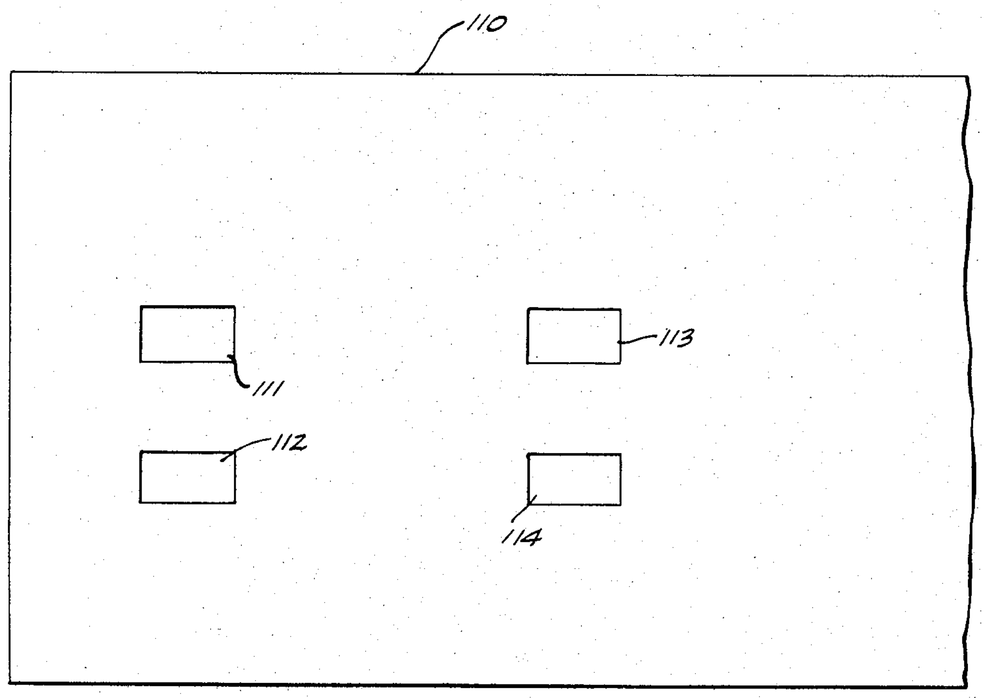

FIGURES 4(*b*) to 4(*j*) are diagrams of waveforms useful in explaining the operation of the novel shift register of the present invention;

FIGURE 5 is a schematic block diagram of another arrangement of a shift register in accordance with the invention;

FIGURE 6 is a schematic circuit diagram of one stage of an integrated circuit register that may be utilized in the shift register of FIGURE 1;

FIGURE 7 is a schematic circuit diagram of one embodiment of one stage of an integrated circuit register in accordance with the teachings of the invention;

FIGURE 8 is a schematic expanded top view of a silicon wafer on which two stages of the shift register are deposited in accordance with the invention; and FIGURE 9 is a schematic top view of a mask that may be utilized to etch the shift register structure in FIGURE 8 so that it may be operable in accordance with the teachings disclosed herein.

Attention is first directed to FIGURE 1 which is a block diagram of a register 10, known in the prior art as a duel rank serial shift register. The register 10 is shown comprising of four stages 11 through 14, having upper portions or ranks 11U through 14U and lower portions or ranks 11L through 14L, respectively. It should be appreciated that although only four stages are shown, the register 10 may comprise any number of desired stages. Each rank is diagrammed as comprising a gate 15 connected to a bistable element such as a flip-flop (FF) 16. The inputs to each gate 15 are the inputs to the rank and the output of FF 16 corresponds to the output of the rank. The output of each upper rank is connected to the input of the lower rank of the same stage, while the output of each lower rank is connected to the upper rank of the next succeeding stage.

In addition, each of the gates 15 and the flip-flops 16 of the upper ranks (11U through 14U) is connected by an upper pulse line 17 to a two-phase clock 20 through a control circuit 25 while a lower pulse line 22 connects the clock 20 through circuit 25 to each gate 15 and flip-flop 16 of the lower ranks. The function of the clock 20 is to provide two series of clock pulses of different phases which energize the various ranks to clock or transfer the information or data from rank to rank and stage to stage. A data source 23 is connected to the input of the upper rank (11U) of the first stage 11 through control circuit 25 to supply binary signals or bits such as a "one" or a "zero" thereto. The output of the lower rank 14L is connected to an output terminal 26 which serves as the register's output terminal.

The operation of the register 10 of FIGURE 1 may best be explained in connection with FIGURE 2 in which lines 201, 202 and 203 represent waveforms of the binary signals supplied from source 23 to rank 11U, and the two series of clock pulses from clock 20 respectively. Let us assume that clock pulses $P_{U1}$ through $P_{U15}$ of a first phase $\theta_1$ (line 202) are supplied to the upper ranks via pulse line 17 at times $t_1$ through $t_{15}$ respectively while pulses $P_{L1}$ through $P_{L15}$ of a second phase $\theta_2$ (line 203) are supplied to the lower ranks at times $t_{1a}$ through $t_{15a}$ respectively. The periods or cycles between successive pulses of the first phase $\theta_1$ may be defined as $X_{U1}$ through $X_{U15}$, while the periods between successive pulses of the second phase are defined as $X_{L1}$ through $X_{L15}$.

In operation, the data signals (line 201) from data source 23 are supplied in synchronism with the pulses $P_{U1}$ through $P_{U15}$ shown in line 202. The negative going pulses $D_1$ through $D_{11}$ represent binary "1's," while the absence of negative pulses at times $t_2$, $t_6$, $t_9$ and $t_{12}$ represent binary "0's."

The function of each clock pulse $P_U$ supplied to an upper rank is to control the flip-flop of each upper rank to respond to the output of its respective gate and maintain such an output until the end of the period until the next clock pulse $P_U$ is provided. The function of the gate

15 is to provide an output as a function of the two input signals thereof. Each gate 15 may operate as a NAND gate providing a binary "1" output when at least one of its inputs is a binary "0." For example, at time $t_1$ data signal $D_1$ and clock pulse $P_{U1}$ are supplied to gate 15 of rank 11U. Also pulse $P_{U1}$ is supplied to the flip-flop of rank 11U to control it to respond to the output of the gate 15. Since both $P_{U1}$ and $D_1$ are binary "1's," the output of gate 15 is a binary "0" which controls the output of flip-flop 16 to be a binary "0" as indicated by the level designated by line 205.

At the end of the duration of pulses $D_1$ and $P_{U1}$, the inputs to gate 15 become binary "0's" so that the gate 15 provides a binary "1" output. However, this does not affect the output of the flip-flop 16 of the rank 11U since its output can only change during the duration of a clock pulse, such as pulse $P_{U1}$. Thus, the output of rank 11U remains a binary "0" until the end of period $X_{U1}$ when at time $t_2$ a second clock pulse $P_{U2}$ is supplied thereto. Then $P_{U2}$ controls the flip-flop to provide an output which is a function of the output of gate 15 which as previously pointed out is dependent on the two inputs thereof.

Figure 2:
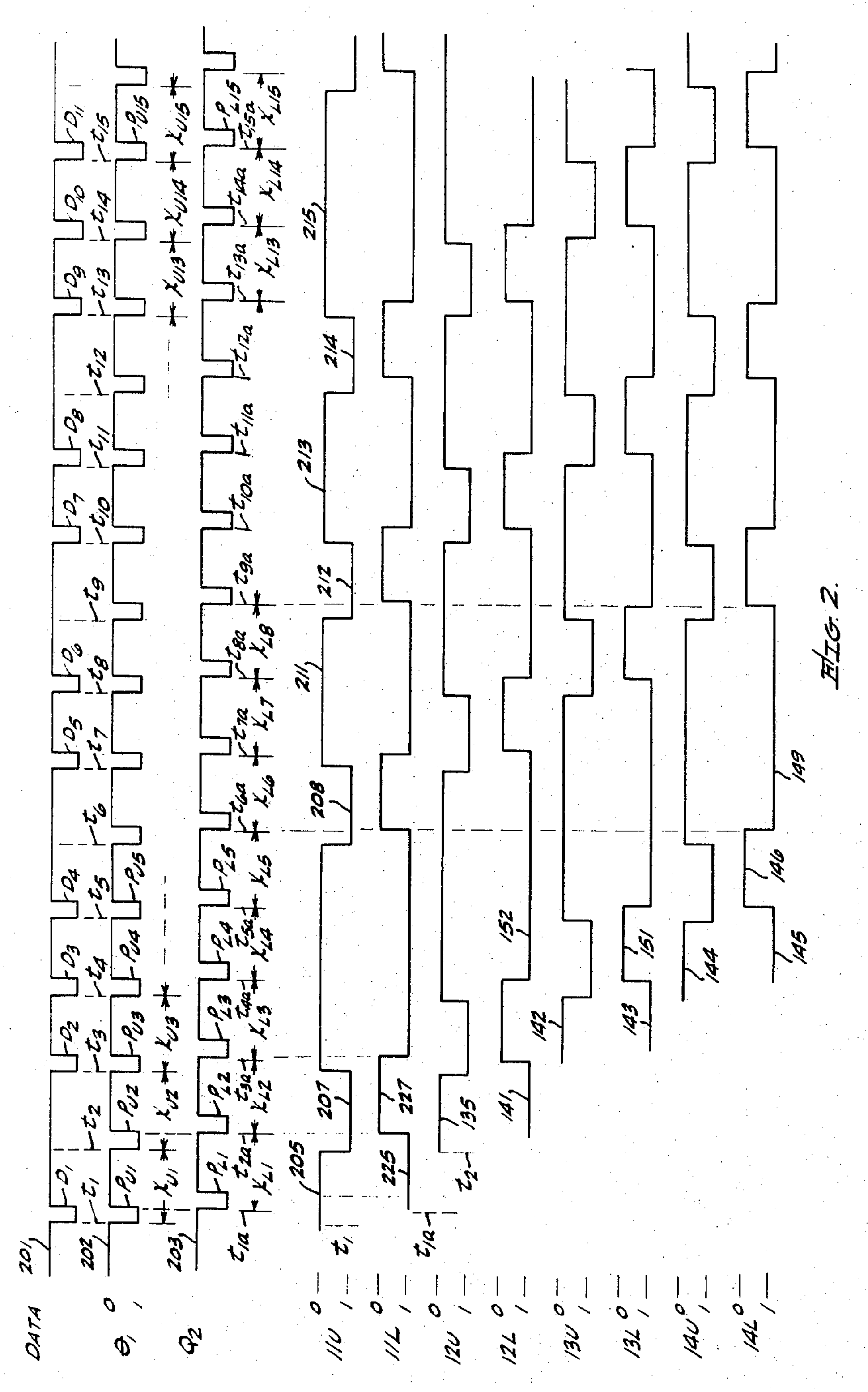
FIGURE 2 is a diagram of waveforms useful in explaining the operation of a conventional dual rank serial shift register, such as the one shown in FIGURE 1.

As seen from FIGURE 2, at time $t_2$, the data signal or pulse is a binary "0" so that one of the inputs to gate 15 of rank 11U is a "0." Thus, its output becomes a binary "1," changing the output of flip-flop 16 to be a binary "1" as indicated by line 207. The output of rank 11U remains a binary "1" (line 207) until time $t_3$ when pulses $D_2$ and $P_{U3}$ both representing a binary "1" are supplied to gate 15. Then the output of gate 15 changes to a binary "0," changing the output of the rank 11U to a binary "0" during the period $X_{U3}$. At times $t_4$ and $t_5$, binary "1's," represented by data pulses $D_3$ and $D_4$ respectively, are supplied simultaneously with respectively clock pulses $P_{U4}$ and $P_{U5}$. Therefore, at each time ($t_4$ or $t_5$), the output of gate 15 remains a binary "0" so that during periods $X_{U4}$ and $X_{U5}$ the output of rank 11U remains a binary "0" as indicated by line 217. Only at time $t_6$, when the data pulse is a binary "0," does the output of rank 11U change to a binary "1," as indicated by line 208. From the foregoing, it should therefore become apparent that the output of rank 11U changes as indicated by lines 211–215 in response to data pulses $D_5$ through $D_{11}$ supplied at times $t_7$, $t_8$, $t_{10}$, $t_{11}$, $t_{13}$, $t_{14}$ and $t_{15}$ respectively.

Just as the operation of rank 11U is dependent on the pulses from the clock 20 and the data source 23, the operation of the lower rank 11L is dependent on the clock pulses $P_L$ (line 203) and the output of preceding rank 11U. From FIGURE 2, it is seen that at time $t_{1a}$ when pulse $P_{L1}$ is supplied to the gate 15 of rank 11L, the output of the rank 11U is a binary "0" as shown by line 205. Therefore, the output of gate 15 of rank 11L is a binary "1," setting the output of its rank to be a binary "1" as shown by line 225. The output of rank 11L remains a binary "1" for the duration of period $X_{L1}$, until at time $t_{2a}$ clock pulse $P_{L2}$ is supplied to lower rank 11L. Then its flip-flop 16 is energized to respond to the output of its associated gate 15 which is a function of pulse $P_{L2}$ and the output of the preceding rank 11U represented by line 207. Since at time $t_{2a}$ the output of rank 11U is a binary "1," the output of gate 15 and flip-flop 16 becomes a binary "0" as indicated by line 227. This output remains unaltered for the duration of period $X_{L2}$ until time $t_{3a}$ when pulse $P_{L3}$ is supplied and the output of rank 11U is a binary "0" as indicated by line 217. Consequently, the output of rank 11L becomes a binary "1" as indicated by line 227.

From the foregoing, it should be clear that the output of rank 11L is a function of the output of rank 11U when clock pulses $P_{L1}$ through $P_{L15}$ are supplied thereto. Generally, it can be stated that the output of rank 11L is set to be the complement of the output of the preceding rank 11U at the time a clock pulse ($P_L$) is supplied to the lower rank 11L. Furthermore, this output does not change until the next clock pulse which is supplied to the lower rank.

Similarly, the output of each of ranks 12U, 12L, 13U, 13L, 14U and 14L is controlled as a function of the clock pulses supplied thereto and the output of the preceding rank at the times the clock pulses are supplied. Thus, at time $t_2$, rank 12U is set to a binary "0" as indicated by line 135 of waveform 136, since at time $t_2$ when pulse $P_{U2}$ is supplied to rank 12U, the output of the preceding rank 11L is a binary "1" as indicated by line 225. Similarly, at times $t_{2a}$, $t_3$, $t_{3a}$ $t_4$ and $t_{4a}$, ranks 12L, 13U, 13L, 14U and 14L respectively are set to have outputs corresponding to binary "1," "0," "1," "0" and "1" respectively, as indicated by respective lines 141 through 145.

From the foregoing, it is seen that the effect of the data pulse $D_1$ supplied at time $t_1$ to the first rank 11U is to control the output of the last rank 14L after a time delay which is substantially equal to the period between successive pulses of the same phase, times the number of stages of the register. In the foregoing example, the number of stages is four. Thus the delay is equal to four clock pulse periods ($X_U$ or $X_L$), neglecting the time duration between two pulses of different phases, such as the time duration between $t_4$ and $t_{4a}$. Thereatfer, the output of rank 14L will vary in accordance with the input data pulses. As seen in FIGURE 2, at the end of period $X_{L4}$, the output of rank 14L changes to a binary "0" as indicated by line 146 due to the binary "0" which was supplied to rank 11U at time $t_2$, while the three consecutive binary "1's" data pulses $D_2$, $D_3$ and $D_4$ (line 201) cause the output of the last rank 14L to remain at the binary "1" level during three consecutive periods $X_{L6}$, $X_{L7}$ and $X_{L8}$ as indicated by line 149. Thus by sensing the output level of rank 14L during each $X_L$ period, the sequence of the binary signals supplied from data source 23 to the first rank of the register 10 can be determined.

Summarizing the operation of register 10 (FIGURE 1), the output level during each period of any rank can be expressed as $Q_n^{[x]}$, where $Q_n$ designates that it is the output during the entire period $x$. Since the output during each period $Q_n^{[x]}$ is equal to the output of the rank when a clock pulse P is supplied thereto, it can be stated that $Q_n^{[x]}=Q_n^{[p]}$ where $Q_m^{[p]}$ represents the output during the portion of the period when a clock pulse is supplied thereto. On the other hand, since the output during such a period is a function of the binary values of the clock pulse and the output of the preceding rank, the output of each rank can be expressed as $$Q_n^{[x]}=Q_n^{[p]}=\overline{Q_{n-1}^{[p]}\cdot P}$$

where $$Q_{n-1}^{[p]}$$

represents the output of a preceding rank when a clock pulse P is supplied to rank $n$, and P represents the clock pulse supplied to rank $n$. For example, the output of rank 11L during period $X_{L2}$ expressed as $$Q_{11L}^{[X_{L2}]}$$

is equal to the output of rank 11L when pulse $P_{L2}$ is supplied thereto, i.e.

$$Q_{11L}^{[X_{L2}]}=Q_{11L}^{[P_{L2}]}$$

This output, however, is the complement of the "And" function of the clock pulse $P_{L2}$ and the output of rank 11U when clock pulse $P_{L2}$ is supplied to rank 11L. Thus, the output can be expressed as, $$Q_{11L}^{[X_{L2}]}=Q_{11L}^{[P_{L2}]}=\overline{Q_{11L}^{[P_{L2}]}\cdot P_{L2}}$$

Since in the foregoing example, the clock pulse ($P_{L2}$) is assumed to be always a binary "1," it can be stated that the output of each particular rank during its respective period is the complement of the output of a preceding rank at the time the particular rank is energized by its clock pulse.

It should be appreciated that since the only means of controlling the storing of bits in the register is by controlling the bits supplied from data source 23, in order to store a multibit number in selected ranks of the register, it is necessary to serially supply each bit of the number during another clock pulse cycle. Consequently, the time required to store a multibit number is a function of the clock pulse cycle length and the number of bits of the number. For example, if it is desired that lower ranks 14L, 13L, 12L and 11L simultaneously store or have outputs corresponding to binary numbers 1, 0, 1 and 1 respectively, such as are represented by lines 145, 151, 152 and 227 respectively, it is necessary to sequentially or serially supply bits 1, 0, 1 and 1 to the register during times $t_1$, $t_2$, $t_3$ and $t_4$ respectively so that only during a subsequent time interval $t_{5a}$–$t_{4a}$ the particular lower ranks have the desired outputs. The required time necessary to place the register in a desired state places a definite limitation on the serial shift register which is incorporated in high speed data processing equipment. In addition, the requirement to serially supply the bits to the register in order to set it so that a desired multibit number is stored therein produces related problems, especially when the register forms a part of a special purpose computer. The register's serial operation often requires that added circuitry be included in the computer for rerouting signals while the register is being set to store the desired multibit number.

In accordance with the teachings of the present invention however, a novel shift register is provided which, in addition to operating as a conventional serial shift register, is also adapted to be operated in a parallel-like mode whereby a selected multibit number may be stored in the register without the need to serially supply each bit thereto.

Figure 3:
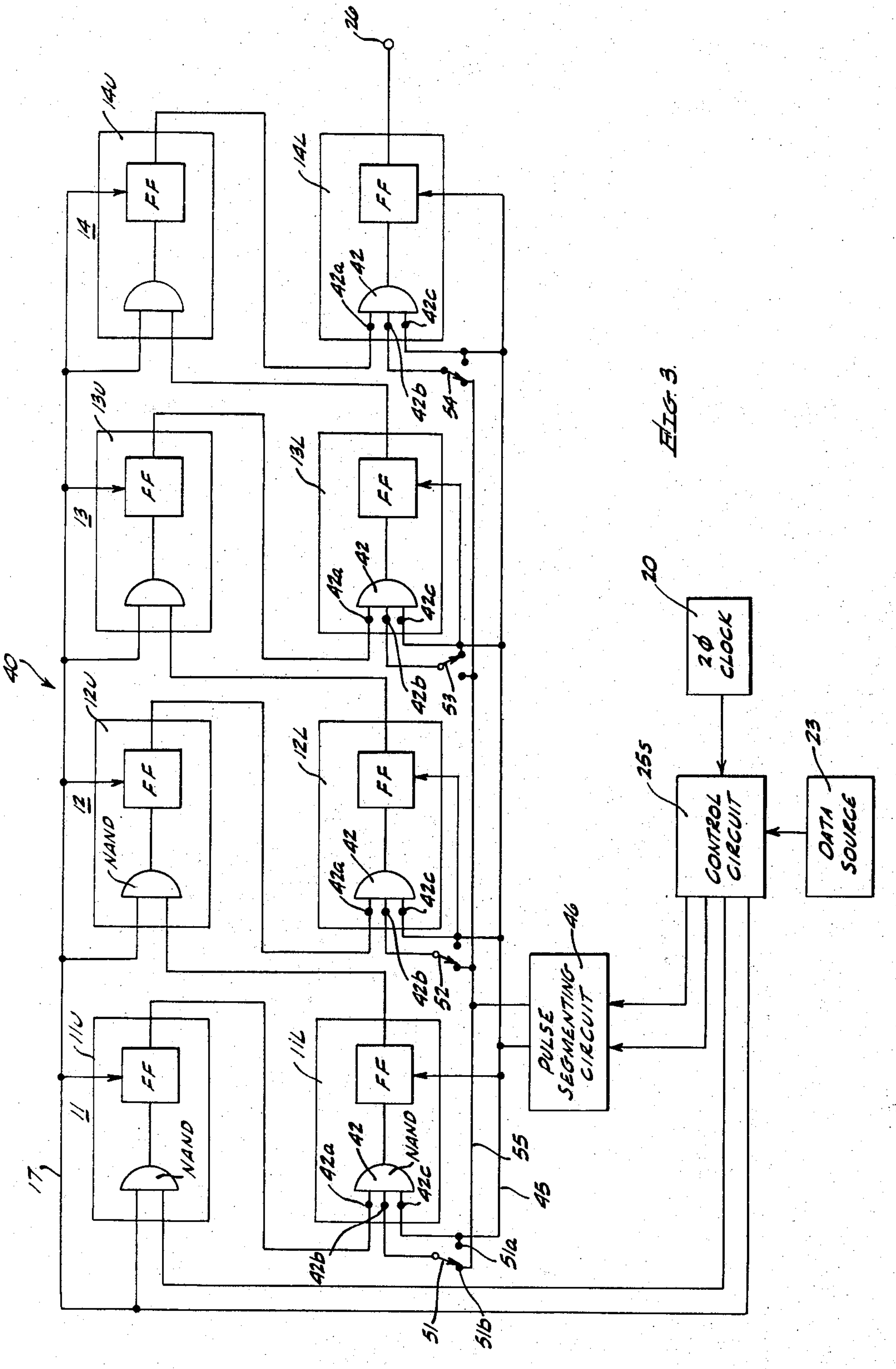
FIGURE 3 is a schematic block diagram of one arrangement of the shift register in accordance with the invention.

Reference is now made to FIGURE 3 which is a block diagram of one embodiment of the shift register of the present invention. As seen, the register 40 is similar to the register 10 (FIGURE 1) except that in the register 40 the gates of the lower ranks 11L–14L include gates 42 each one of which has three inputs. One input 42*a* is connected as herebefore to the output of the upper rank of the same stage, while another input 42*c* is connected to a line 45 of a pulse segmenting circuit 46. The third input 42*b* of each of the gates 42 of ranks 11L through 14L is selectively connected by means of switches 51 through 54 respectively to either line 45 or a second line 55 of the circuit 46.

Each of gates 42 is a NAND gate, in the illustrative example in accordance with the invention. Namely, it provides an output representing a binary "1" when at least one of its inputs is a binary "0." In the prior art register 10 herebefore described, each rank is provided with only a single input for clock pulses and the clock pulses are always binary "1's." Therefore the output of each gate in the prior art register is a function of the output of the preceding rank during the clock pulse portion of each cycle or period. However, in the present invention each NAND gate 42 of each lower rank is provided with two clock pulses simultaneously supplied to inputs 42*b* and 42*c*. Thus the output of each lower rank corresponding to the output of its gate 42 is a function of the NAND function of the three inputs thereof. This can be expressed as $$Q_{Ln}^{[X]}=Q_{Ln}^{[P42b;\ P42c]}=\overline{Q_{Un}^{[P42b;\ P42c]}\cdot P_{42b}\cdot P_{42c}}$$

where $Q_{Ln}^{[X]}$ represents the output during a period $t_x$ of a lower rank of the $n$th stage, which equals the output of the same lower rank $Q_{Ln}$ when the two clock pulses are supplied to its inputs 42*b* and 42*c*, the latter period being designated by the postscript $[P_{42b}; P_{42c}]$. However, the output of any lower rank $Q_{Ln}$ when clock pulses are supplied thereto is the complement of the AND function of the output of the upper rank of the same stage *n*, i.e. $Q_{Un}$ when the clock pulses are supplied to the lower rank and the two clock pulses supplied to inputs 42*b* and 42*c* which are designated as $P_{42b}$ and $P_{42c}$.

For example, the output of rank 11L of register 40 in FIGURE 3 is a function of the output of rank 11U supplied at input 42*a* and the clock pulses $P_{42b}$ and $P_{42c}$ at inputs 42*b* and 42*c* respectively. If the binary signals supplied to all three inputs are binary "1's," the output of rank 11L is a binary "0." However if one of the three inputs is supplied with a binary "0," the output of gate 42 and correspondingly the output of rank 11L is a binary "1." When both clock pulses $P_{42b}$ and $P_{42c}$ are binary "1's," the rank 11L operates as a prior art rank in that the clock pulses are binary "1's" so that the output of the rank depends only on the output of the preceding rank. On the other hand, if the output of upper rank 11U is a binary "1," the output of rank 11L is a function of the binary values of $P_{42b}$ and $P_{42c}$. If both are "1's," the output of rank 11L is a "0." However if one of the clock pulses such as $P_{42b}$ is a "0," the output of the rank is a binary "1." Thus the output of the lower rank 11L can be controlled as a function of the two clock pulses when the output of the upper rank 11U is a "1" rather than as a function of only the output of the upper rank.

The operation of the novel register 40 and the manner by which a multibit number may be stored therein may best be explained in conjunction with FIGURES 4(*a*) through 4(*j*). FIGURE 4(*a*) is a schematic diagram of the control circuit 25*s* and the pulse segmenting circuit 46, shown in FIGURE 3, while FIGURES 4(*b*) through 4(*j*) are waveforms of pulses useful in explaining the operation of the circuitry of FIGURE 4(*a*). FIGURE 4(*b*) is the diagram of data pulses $D_{21}$ through $D_{24}$ supplied from data source 23 to an AND gate 25*a*, while FIGURE 4(*e*) is the diagram of clock pulses $P_{L21}$ through $P_{L25}$ which comprise one series of a clock pulse of a phase $\theta_2$ similar to the series of pulses shown on line 203 of FIGURE 2. Pulses $P_{L21}$ through $P_{L25}$ are supplied to one input of an AND gate 25*b* and to one input terminal 46*a* of pulse segmenting circuit 46. A second series of pulses $P_{U21}$ through $P_{U25}$ shown in FIGURE 4(*c*) is supplied from data source 23 to the other input of gate 25*a* and to one input of an OR gate 25*c*. Pulses $P_{U21}$ through $P_{U25}$ of phase $\theta_1$ are similar to the pulses shown on line 202 in FIGURE 2.

The other input of gate 25*c* is connected to the output of AND gate 25*b* which has its other input connected to the output of a flip-flop 25*d*. The output of AND gate 25*b* is also connected to a second input terminal 46*b* of circuit 46 through a delay circuit 25*e* and to the enable-disable input of a gate 25*f* which controls the supply of the output of AND gate 25*a* to the first rank 11U.

The waveforms of the outputs of gates 25*b*, 25*c* and delay circuit 25*e* are diagrammed in FIGURES 4(*i*), 4(*d*) and 4(*j*), while FIGURE 4(*h*) represents the waveform at an input terminal 25*g* of flip-flop 25*d* and FIGURES 4(*f*) and 4(*g*) are the waveforms at the output lines 45 and 55 respectively of circuit 46. As seen from FIGURE 4(*a*), the pulse segmenting circuit comprises three NOR gates 46*c*, 46*d* and 46*e* and three inverters 46*f*, 46*g* and 46*h*. Input terminal 46*b* is connected to one input of each of NOR gates 46*c*, 46*d* and 46*e*, while the other input of gate 46*c* is connected to terminal 46*a* through inverter 46*f*. The output of gate 46*c* is directly connected to the other input of gate 46*d* and to the other input of gate 46*e* through inverter 46*g*. The output of gate 46*e* is connected to output line 55 while line 45 is connected to the output of gate 46*d* through inverter 46*h*.

Recalling that a NOR gate provides an output which is a binary "1" only when all its inputs are binary "0's," it becomes apparent to one familiar with the art that when a signal representing binary "1" is impressed at terminal 46*a*, signals representing binary "1's" are impressed in both lines 45 and 55. On the other hand, when a signal representing a "1" is at terminal 46*b*, the signals impressed in lines 45 and 55 represent binary "1" and "0" respectively.

In operation, in the absence of a command signal or pulse 170 [FIGURE 4(*h*)] at terminal 25*g* [FIGURE 4(*a*)], the register 40 operates as a conventional serial shift register as herebefore described. Namely, in the absence of pulse 170, the output of gate 25*b* is a binary "0" so that gate 25*f* is open, enabling data pulses such as $D_{21}$ through $D_{24}$ [FIGURE 4(*b*)] to be supplied to rank 11U in time coincidence with clock pulses $P_{U21}$, $P_{U22}$, $P_{U23}$ and $P_{U25}$ supplied to the upper ranks. Also, when the output of gate 25*b* is a "0," the signal at terminal 46*b* is a zero. Therefore, the signals on lines 45 and 55 are a function of the signal at terminal 46*a*. For each $P_L$ pulse [FIGURE 4(*e*)], binary "1" pulses are impressed in lines 45 and 55 [FIGURES 4(*g*) and 4(*f*) respectively]. Thus, each lower rank is supplied with two clock pulses both of which are binary "1's." Therefore, the two clock pulses can be thought of as a single pulse.

However, if after operating in a conventional mode, it is desired to store a multibit number in the lower ranks 11L through 14L, command pulse 170 [FIGURE 4(*h*)] is impressed at time $t_{100}$ at terminal 25*g*. Then when the next $P_L$ pulse, namely $P_{L23}$ [FIGURE 4(*e*)] is supplied from data source 23 at time $t_{101}$, AND gate 25*b* provides an output representing a "1" indicated in FIGURE 4(*i*) by pulse 175. Pulse 175 enables OR gate 25*c* to provide an output which is a binary "1" represented by pulse $P_{UX}$ [FIGURE 4(*d*)]. Pulse $P_{UX}$ acts as a clock pulse which is supplied via line 17 to all the upper ranks. Thus between time $t_{101}$ and $t_{102}$ equaling the period of pulse $P_{L23}$, clock pulses representing binary "1's" are supplied in time coincidence to both the upper and lower ranks of register 40. Also the output pulse 175 of AND gate 25*b* disables gate 25*f* so that during the period between $t_{101}$ and $t_{102}$, a data signal representing a "0" as indicated by line 178 in FIGURE 4(*b*) is supplied to the first rank 11U.

The presence of a data signal representing a "0" which is supplied to rank 11U and the supply in time coincidence of clock pulses representing binary "1's" to both the upper and lower ranks, sometimes referred to as asynchronous clocking, results in all the upper ranks being set to have outputs representing binary "1's" and all the lower ranks set to binary "0's" at the end of time $t_{102}$. Thus each lower rank is supplied with a binary "1" output from its respective upper rank.

Referring to FIGURES 4(*a*), 4(*i*) and 4(*j*), it is seen that the output of gate 25*b* represented by pulse 175 is also supplied to delay circuit 25*e* which delays pulse 175 by a time $\Delta t$ and provides a pulse 180 representing a binary "1" at terminal 46*b* between $t_{103}$ and $t_{104}$, where $t_{103}-t_{101}=\Delta t$ and $t_{104}-t_{103}=t_{102}-t_{101}$. Thus during the duration $t_{104}-t_{103}$ a binary "1" (pulse 180) is impressed at terminal 46*b*. Consequently, a binary "1" signal as represented by pulse 182 [FIGURE 4(*g*)] is impressed on line 45 while a binary "0" signal as represented by the absence of a pulse as line 184 is impressed on line 55.

From the foregoing, it is thus seen that during the period $t_{104}$–$t_{103}$, the signals supplied to each lower rank (FIGURE 3) from its upper rank via terminal 42*a* and from line 45 via terminal 42*c* represent binary "1's." However, the signal at terminal 42*b* depends on the position of its corresponding switch. For example, during $t_{104}$–$t_{103}$, the signal at terminal 42*b* of 11L depends on the position of switch 51. When the switch contacts terminal 51*a* coupled to line 45, the signal at terminal 42*b* is a binary "1." Consequently, all three inputs of gate 42 are binary "1's" and therefore the output of rank 11L is a binary "0." On the other hand, if switch 51 is in contact with terminal 51*b* coupled to line 55, the signal at terminal 42*b* is a binary "0." Consequently, one of the three inputs of gate 42 is a binary "0" and therefore the output of rank 11L is a binary "1."

Since all the lower ranks are connected in parallel to line 45 and by means of switches 51 through 54 are connected to line 55, it should be apparent that during period $t_{104}$–$t_{103}$, each of the lower ranks can be set to store or have an output which is either a "1" or a "0" depending on the position of its respective switch. Thus a complete multibit number may be stored in the lower ranks during the period $t_{104}$–$t_{103}$. For example, the number 1011 may be stored in ranks 14L, 13L, 12L and 11L respectively by setting switches 54, 52 and 51 prior to $t_{103}$ to be in contact with line 55 and setting switch 53 to be in contact with line 45. Then between $t_{103}$ and $t_{104}$, one input of the three inputs to each of ranks 11L, 12L and 14L is a binary "0" and therefore the ranks are set to have binary "1" outputs. On the other hand, the three inputs of rank 13L are all binary "1's" resulting in a binary "0" output therefrom.

From the foregoing description of the prior art register and the novel register of the present invention, it should be apparent that the novel register includes circuits or means whereby the register can be operated in a conventional serial mode as well as respond to a command signal to store in parallel a multibit number in its lower rank. The storing occurs during period $t_{104}$–$t_{103}$ which is only a portion of a single clock pulse cycle between successive clock pulses of one of the clock pulse series, while in the prior art, a plurality of clock pulse cycles must elapse before the conventional register can be set to store the same number. From FIGURES 4(*b*) through 4(*j*), it is further apparent that after a multibit number is stored in register 30 at time $t_{104}$, the register continues to operate as if in a conventional mode so that subsequent data signals or pulses such as a binary "0" supplied at time $t_{108}$ indicated by line 186 in FIGURE 4(*b*) and a binary "1" indicated by pulse $D_{24}$ supplied at $t_{109}$ are clocked into the register in a serial mode by clock pulses $P_{U24}$ and $P_{L24}$, and $P_{U25}$ and $P_{L25}$ respectively.

From the foregoing, it should thus be appreciated that by segmenting one of the clock pulse lines such as line 22 (FIGURE 1) of a conventional dual rank serial shift register in accordance with the teachings of the invention, the various lower ranks associated with such a clock pulse line may be selectively provided with two clock pulses via lines 46 and 55 (FIGURE 3) which represent binary values which are either the same or which are complements of one another so that a preselected bit may be stored in parallel in each rank, thereby storing a multibit number in the register in parallel. Although in FIGURE 3 the clock pulses to the lower ranks are shown segmented, it is appreciated that the clock pulses to the upper ranks may be similarly segmented in accordance with the teachings disclosed herein. Furthermore, the clock pulses to both ranks may be segmented so that multibit numbers may be selectively stored in either the upper or lower ranks. Such an embodiment is diagrammed in FIGURE 5 to which reference is made herein.

Register 60 of FIGURE 5 is similar to register 40 of FIGURE 3 except that in addition to segmenting the clock pulses supplied to the lower ranks, the pulses supplied to the upper ranks are also segmented. Register 60 includes two pulse segmenting circuits 46U and 46L, each being identical with circuit 46 herebefore described. Each of output lines 45L and 45U performs functions similar to that performed by line 45 shown in FIGURE 3, while each of lines 55L and 55U is similar to line 55. Also switches 51L–54L and 51U–54U perform functions similar to those performed by switches 51–54. Register 60 also includes a control circuit **25*x* which is similar to circuit 25*s* (FIGURE 3) except that it includes additional elements such as flip-flop 25*d*, gates 25*b* and 25*c* and delay circuit 25*e* necessary to control the segmenting of the clock pulses by circuit 46U** when a multibit number is to be stored in the upper ranks.

Assuming that the switches 51L–54L and 51U–54U are in the positions shown in FIGURE 5, from the foregoing it should be appreciated that by providing a first command signal such as pulse 170 [FIGURE 4(*h*)], all the upper ranks may first be set to store "1's" and thereafter the clock pulses are segmented on lines 45L and 55L with a binary "1" being impressed on line 45L and a binary "0" on line 55L. Since one input terminal of each of lower ranks 11L and 14L is connected via its respective switch to line 55L, it is supplied with a binary "0" so that ranks 11L and 14L are set to store binary "1's." However, ranks 12L and 13L which are connected via their respective switches to line 45L are supplied with two clock pulses representing binary "1's" and therefore the two ranks store binary "0's." Thus the multibit number 1001 is stored in ranks 11L through 14L.

Similarly by providing a second command signal all the lower ranks may first be set to store "1's" and then the clock pulses may be segmented on lines 45U and 55U with a binary "1" signal on line 45U and a binary "0" signal on line 55U. Since switches 51U, 52U and 53U connect ranks 11U, 12U and 13U respectively to line 55U, a "1" is stored in each of these ranks while a "0" is stored in rank 14U since its switch 54U connects it to line 45U. Thus the number 1110 is stored in the upper ranks.

From the foregoing, it is thus seen that by segmenting the pulses supplied to both ranks, a different multibit number may be selectively stored in each rank. Furthermore, if each of switches 51U–54U and 51L–54L is not permanently positioned, but rather may be selectively controlled by a switch control circuit (not shown) then the bit stored in each rank of any stage may be controlled by controlling the line with which the particular switch is in contact. For example, by reversing the illustrated position of only switch 51L, the multinumber 0001 is storable in the lower ranks of the register. Similarly by reversing the positions of switches 52U and 54U, the multibit number 1011 may be stored in the upper ranks.

The teachings of the present invention whereby the clock pulses to one or more ranks of a multirank multistage serial shift register are segmented so that the register in addition to being operable in a conventional serial mode, is also adapted to have a predetermined multibut number stored therein in parallel, are not limited to a register constructed of discrete components. Rather the teachings are equally applicable to registers of the integrated circuit type, wherein the various components are integrated in a single silicon chip. Furthermore, the teachings may be employed to modify presently known integrated type dual rank shift registers so that in addition to operating as conventional serial registers, multibit numbers may be stored therein in parallel.

FIGURE 6, to which reference is made herein, is a schematic diagram of one stage of a prior art integrated circuit shift register. The stage comprises an upper rank 71 which includes three field-effect transistors (FET) 72, 73 and 74, while the lower rank 75 includes field effect transistors 76, 77 and 78. The gates, designated by the letter G, of transistors 72 and 73 are connected to one clock pulse line, such as line 17 in FIGURE 1, while the gate of transistor 74 is connected to an input line which is either connected to the output line of a preceding rank or to a data source, such a source 23 (FIGURE 1). Similarly, the gates of transistors 77 and 78 are tied together and connected to a second clock pulse line, such as line 22 in FIGURE 1. The gate of transistor 76 is connected by means of line 79 to receive the output of the upper rank from the junction point of transistors 72 and 73, while the junction point of the drain, designated by the letter D, and source designated by the letter S, of transistors 77 and 78 are connected to an output line 81 of the lower rank 75. In FIGURE 6, the drains of transistors 72 and 78 are connected by means of lines 82 and 83 to a source of negative operating potential $-V_D$.

The mode of operation of the stage shown in FIGURE 6 may be described as follows. Let us assume that the voltage at the gate of transistor 76 is at about ground potential which is high with respect to $-V_D$ thereby representing a binary "0." Therefore, the drain to source path thereof represents a high impedance path. Consequently, when clock pulses representing binary "1's" are supplied to the gates of transistors 77 and 78, current flows between the voltage source $-V_D$ to the gate of a transistor 74 of a succeeding upper rank through the drain to source path of transistor 78 rather than to ground through transistor 76. As a result, during the presence of clock pulses on line 22, a charge is built up between the gate of transistor 74 of the succeeding upper rank and the silicon strata on which the drain and source of transistor 74 are diffused. Thus, the potential at the gate of transistor 74 reaches $-V_D$ representing a binary "1."

Between clock pulses to transistors 77 and 78, the voltage tends to decrease slightly since the charge between the gate and the strata of transistor 74 of the succeeding rank decreases. However, if the frequency or rate at which clock pulses are supplied to transistors 77 and 78 is high enough, the change in voltage at the gate of transistor 74 of the succeeding rank and therefor on output line 81 is very small so that effectively the voltage remains constant at $-V_D$ thereby representing a binary "1."

On the other hand, if at the time that the clock pulses are supplied to transistors 77 and 18, the gate of transistor 76 is at a low voltage ($-V_D$) representing a binary "1," the drain to source paths of the three transistors 76, 77 and 78 represent low impedance paths so that current flows between the source $-V_D$ and ground. However, the current saturation point of transistor 78 is much lower than that of transistors 76 and 77 so that when the current reaches the transistor's saturation level, the voltage between the drain and source of transistor 78 increases. Thus, most of the potential drop occurs thereat so that the voltage at the source of transistor 78 is only slightly below ground, thereby representing a binary "0."

It is thus seen that in the stage shown in FIGURE 6 when binary "1" clock pulses are supplied via line 22 to transistors 77 and 78 and the potential on input line 79 is a binary "0," the potential at output line 81 is substantially $-V_D$ representing a binary "1." On the other hand, when the potential at line 79 is $-V_D$ representing a binary "1," the potential at line 81 is close to ground, representing a binary "0." Thus the circuit of FIGURE 6 operates as a stage in a conventional dual rank serial shift register.

In accordance with the teachings of the present invention of segmenting the clock pulses supplied to the elements in at least one of the ranks in each stage, such as the lower rank, the stage shown in FIGURE 6 may be conveniently modified as shown in FIGURE 7 by connecting the gates of transistors 77 and 78 to separate segmented clock pulse lines such as lines 45 and 55 shown in FIGURE 3. Thus, the gate of transistor 78 may be connected to a switch 84 which in turn may be selectively switched to be in contact to either line 45 in which case the rank operates as a conventional rank, or to line 55. In the latter case, the gate of transistor 77 is supplied with a clock pulse which is the complement of the clock pulse supplied to the gate of transistor 78 so that a binary "1" may be stored in the rank 75.

From the description of the teachings of the invention and the operation of the circuit shown in FIGURE 6, it should thus be appreciated that in FIGURE 7 the potential at line 81 is a function of the potential at input line 79 as well as the clock pulses. When the potential at line 79 represents a binary "1" and the clock pulse via line 45 supplied to the gate of transistor 78 is a binary "1," the potential at the output line 81 depends on the pulse clock at the gate of transistor 77. When the pulse clock at the gate is a binary "1," the stage operates as herebefore described with the potential at line 81 being close to ground, thereby representing a binary "0". However, if the gate of transistor 77 is connected via switch 84 to line 55 to be supplied with a clock pulse representing a binary "0," the path between $-V_D$ to ground is blocked by the high impedance of transistor 77 so that transistor 78 is used to charge up the capacitance between the gate of the input transistor 74 of the next rank. Consequently, the potential at line 81 is substantially $-V_D$ representing a binary "1." Thus, the binary value at line 81 is a function of the position switch 84.

A plurality of stages, each similar to the stage shown in FIGURE 7 may be constructed as an integrated circuit. For example, the various field effect transistors may be formed by employing metal oxide silicon diffusion techniques, with a plurality of deposited metallic leads being used to provide the necessary connections therefor. Such transistors are known in the art by the acronym MOSFET for metal oxide silicon field effect transistors.

Referring to FIGURE 8, there is shown an expanded top view of a silicon wafer 90 on which are deposited two stages 91 and 92 similar to that shown in FIGURE 7. The stages comprise of upper ranks 91U and 92U and lower ranks 91L and 92L. Each of ranks 91U and 92U comprises of three MOSFETS 72, 73 and 74 formed by diffusions 94 through 97 of boron or phosphorus material in the silicon wafer 90, with thin layers of silicon oxide ($SiO_2$) indicated by the dashed rectangles 72G, 73G and 74G being thermally developed or grown on the silicon between close and parallel boundaries of each pair of diffusions, to form the gates of the transistors 72, 73, and 74. Diffusion 97 is connected to ground potential. Similarly, transistors 76, 77 and 78 are formed by diffusions 97 through 100 and oxide layers 76G, 77G and 78G necessary to form the gates of the three transistors of the lower rank. Connections to the various gates are made by means of metal strips which are deposited thereon. In FIGURE 8, the solid dots 101 represent electrical connection between metal strips and various diffusions.

As is appreciated by those familiar with the art, all the metal strips may be formed by first depositing a metallic layer and then etching it so that only the desired metallic configuration remains as part of the circuit. From FIGURE 8 and in particular, the bottom portion thereof, it is seen that the gate of transistor 78 designated by 78G is permanently connected to the metallic strip 45 which represents clock pulse line 45. On the other hand, gate 77G is covered by a metallic strip which may be part of strip 55 as shown in rank 91L, or it may be connected to strip 45 and separated from strip 55 as in rank 92L. Thus, during the manufacture of the circuit by properly etching the metal layer, the operation of the lower rank of each may be conveniently controlled to operate in a manner as hereinbefore described.

In practice, the integrated circuit may first be constructed and etched so that the metal strip over each gate 77G interconnects metal strips 45 and 55, in which case the register operates as a conventional register. Then, by selectively etching the strip of each gate 77G so that it is in contact with one or the other of metal strips 45 and 55, the particular multibit number may be set in parallel into the register.

In FIGURE 8, the gate 77G of transistor 77 in the lower rank 91L is shown connected to metallic line 55 by metallic area 102, with the area 103 between line 45 and the gate being etched away, while gate 77G in lower rank 92L is connected to line 45 by metallic area 105 and the area 104 between the gate and the line 55 being etched to remove any metal therefrom. In practice, the etching may be conveniently accomplished by providing a mask 110 shown in FIGURE 9 in which are defined a plurality of apertures, designated 111 through 114. Two apertures, such as 111 and 112, are associated with each lower rank, such as rank 91L. The spacing between each pair of apertures and their sizes are controlled so that the area between the gate 77G and each of the adjoining lines 45 and 55 may be completely etched thereto. From FIGURES 8 and 9, it is seen that by placing mask 110 over the lower ranks 91L and 92L, one aperture of each pair may be masked or covered and the other aperture used to etch away the metal from the desired area. For example, by placing the mask 110 over the lower ranks, areas 102 through 105 will be exposed through apertures 111 through 114 respectively. Thus by covering apertures 102 and 105, areas 103 and 104 may be simultaneously etched through apertures 112 and 113 respectively. The apertures may assume any desired shape, such as circular, elliptical, or rectangular, the requirement being that the areas to be etched therethrough are fully exposed.

From the foregoing, it should become apparent that as long as each gate 77G in a lower rank is connected to both lines 45 and 55, the register functions as a conventional register. Thus, in practice, the novel integrated circuit register may be produced first to operate in a conventional mode. Then depending on the requirements of any user, the desired areas may be etched to be able to store in parallel any multibit number chosen by the user. Such a capability greatly increases the advantages of the novel shift register since it can first be built as a standard register and then selectively modified to meet specific requirements of different users.

In the arrangement of FIGURE 8, it has been assumed that each of the various gates 77G is permanently connected to either one or the other clock pulse metal strip. Such an arrangement is conveniently realizable in an integrated circuit, formed on a single layer. However it should be appreciated that the invention may be extended to multilayer integrated circuits in which case a separate layer may be used to provide each gate 77G with a metallic strip which in turn may be selectively coupled to either clock pulse metallic strip 45 and 55. Thus by selectively controlling the connections, any desired multibit number may be stored in the register by merely controlling which of the gates 77G are to be connected to strip 45 and which ones are to be connected to strip 55.

There has accordingly been shown and described herein a novel shift register which is operable as a conventional serial shift register but in addition can be controlled to store in parallel a predetermined multibit number. The parallel storing is accomplished by selectively coupling a selected rank of each stage to be energized by a given clock pulse or its complement so that either a binary "0" or a binary "1" is stored therein. It is appreciated that those familiar with the art may make modifications in the arrangements as shown without departing from the true spirit of the invention. Therefore, all such modifications and equivalents are deemed to fall within the scope of the appended claims.

What is claimed is:

1. In a binary multistage shift register responsive to a source of first and second clock pulses, data signals and command signals, and wherein each stage includes an upper rank and a lower rank including means responsive to a first clock pulse for transferring a bit stored in an upper rank of each stage to a lower rank of the respective stage, and means responsive to a second clock pulse for transferring a bit stored in the lower rank of each stage to the upper rank of the next succeeding stage the improvement comprising:

control means coupled to each stage of at least one rank of said shift register and responding to said clock pulses, data signals and command signals for synchronously setting the ranks of said register so that all stages of the same rank are set to the same state; and segmenting means, having at least a first segmented line and a first complementary line, said lines being selectively coupled to each stage of at least one rank of said register; said segmenting means responding to command signals and at least one of said clock pulses for segmenting at least one of said clock pulses to provide on said first segmented line and said first complementary line one of said clock pulses and the complement thereof, respectively, so as to set the stages in at least one rank to selected states.

2. In a binary multistage serial shift register as defined in claim 1 wherein said segmenting means comprises means coincidently responsive to said second clock pulse and said command signal for providing said second clock pulse and its complement, on said first segmented line and said first complementary line respectively; and means for selectively coupling one of said lines to the upper rank of each stage, so as to set the stages in said upper rank to states selected by the coupling between the respective stages of said upper rank and the first segmented line and the first complementary line.

3. In a binary multistage serial shift register as defined in claim 1 wherein said segmenting means comprises means coincidently responsive to said first clock pulse and said command signal for providing said first clock pulse and its complement, on said first segmented line and said first complementary line, respectively; means for selectively coupling one of said lines to the lower rank of each stage, so as to set each stage in said lower rank to a state selected by the coupling between the respective stages of said lower rank and the first segmented line and the first complementary line.

4. In a binary multistage serial shift register as defined in claim 1 wherein said segmenting means comprises a first gating control circuit coincidently responsive to a first clock pulse and a first command signal for providing a first clock pulse and its complement clock pulse on said first segmented and first complementary lines respectively, means for selectively coupling one input of the lower rank of each stage to one of said lines so that the lower ranks of the plurality of stages store a first selected multibit number; said clock pulse segmenting means further comprising a second gating control circuit and a second segmented line and a second complementary line, said second gating control circuit being coincidently responsive to a second clock pulse and a second control signal for providing a second clock pulse and its complement clock pulse, on said second segmented and second complement lines respectively, means for selectively coupling one input of the upper rank of each stage to one of said second lines so that the upper ranks of all stages stores a second multibit number; and means for controlling the supply of said first and second control signals to said first and second gating control circuits respectively.

5. The shift register defined in claim 4 wherein each of said first and second gating control circuits includes a clock pulse segmenting circuit having first and second input terminals and first and second output terminals and a plurality of gating elements interconnected therebetween, whereby the signals at said first and second output terminals correspond to a first bit when the signal at said first input terminal corresponds to a first bit and the signal at said second input terminal corresponds to a second bit; and the signals at said first and second output terminals correspond to signals representing first and second bits respectively when the signals at both said first and second input terminals represent a first bit.

6. The shift register defined in claim 5 wherein each of said gating control circuits includes a plurality of interconnected inverters and NOR gates, whereby the signals at said first and second output terminals are binary "1's" when the signal at said first input terminal is a binary "1" and the signal at said second input terminal is a binary "0"; and the signals at said first and second output terminals are a binary "1" and a binary "0" respectively when the signals at both said first and second input terminals are binary "1".

7. In a binary multistage shift register responsive to a source of clock signals and command signals and wherein each stage includes an upper rank and a lower rank, each upper rank being responsive to a clock signal of a first phase for transferring a bit stored therein to the lower rank of its corresponding stage and each lower rank being responsive to a clock signal of a second phase for transferring a bit stored therein to the upper rank of the next succeeding stage, the improvement comprising:

first means responsive to at least one command signal for providing a segmented clock pulse corresponding to a clock pulse of at least one of said phases and the complement of said segmented clock pulse;

second means for energizing each stage of one rank, associated with clock pulses of one of said phases, at one input thereof with the segmented clock pulse; and third means for energizing each stage of said one rank at another input thereof with a selected one of said segmented clock pulse and the complement thereof.

8. The register defined in claim 7 wherein said first means includes a pulse segmenting circuit having a plurality of gating elements interconnected between first and second input terminals and first and second output terminals; the signals at said first and second output terminals both representing binary "1's" when the signal at said input terminal is a binary "1" and the signal at said second input terminal is a binary "0"; and the signals at said first and second output terminals, corresponding to said segmented clock pulse and its complement respectively, representing a binary "1" and a binary "0", respectively, when a signal representing a binary "1" is supplied at both said first and second input terminals.

9. A shift register comprising:

a plurality of stages each stage comprising an upper rank and a lower rank;

means connecting the output of the upper rank to the input of the lower rank;

means connecting the output of the lower rank to the input of the upper rank of the succeeding stage;

means for providing a data input signal to the input of the upper rank of the first stage of said plurality of stages;

clock pulse means for providing first and second series of clock pulses to the upper and lower ranks respectively, each clock pulse in said first series of clock pulses energizing said upper ranks to transfer bits stored therein to their respective lower ranks and each clock pulse in said second series of clock pulses energizing said lower ranks to transfer bits stored therein to the upper ranks of the succeeding stages;

said clock pulse means including at least one clock pulse segmenting circuit having a first segmented line and a first complementary line, and having means for individually selectively coupling said lines to the stages of the lower rank of said register; said clock pulse segmenting circuit responding to a command signal and a clock pulse of said second series for segmenting said clock pulse, to provide on said first segmented line and said first complementary line, respectively, said clock pulse and the complement thereof, so as to set the stages in the lower rank to a state selected by the coupling between the respective stages of the lower rank and the first segmented line and the first complementary line.

10. The register defined in claim 9 wherein said clock pulse means further includes means for synchronously setting the ranks of said registers so that the upper ranks provide enabling signals to their respective lower ranks whereby a first bit is stored in the stages of the lower rank which are energizable only by said clock pulse and a second bit is stored in the stages of the lower rank which are energizable by said clock pulse and the complement thereof.

11. The register defined in claim 10 wherein: each stage of the lower rank includes a bistable element the output thereof representing a bit stored in the stage; and each stage of the lower rank further includes a three input terminal gating circuit having its output connected to the input of said bistable element, with one of said input terminals being connected to the output of the upper rank of the same stage, another of said input terminals being connected to be energized by said clock pulse and a third input terminal being energized by a selected one of said clock pulse and the complement thereof; whereby said bistable element is set to provide an output representing a first bit when said third input terminal is energized by said clock pulse, and a second bit when said third input terminal is energized by the complement of said clock pulse.

12. The register defined in claim 11 wherein the gating circuit is a NAND gate and the output of the upper rank and the clock pulse are binary "1's", with the complement of said clock pulse being a binary "0"; whereby said NAND gate provides an output representing a binary "1" only when said third input terminal is energized by the complement of said clock pulse.

13. A shift register comprising:

a plurality of stages each stage comprising an upper rank and a lower rank;

means connecting the output of each stage of the upper rank to the input of the corresponding stage in lower rank;

means connecting the output of each stage of the lower rank to the input of the upper rank of the succeeding stage;

means for providing a data input signal to the input of the upper rank of the first stage of said plurality of stages;

clock pulse means for providing first and second series of clock pulses to the upper and lower ranks respectively, each clock pulse in said first series of clock pulses energizing said upper ranks to transfer bits stored therein to their respective lower ranks and each clock pulse in said second series of clock pulses energizing said lower ranks to transfer bits stored therein to the upper ranks of the succeeding stages;

said clock pulse means including at least one clock pulse segmenting circuit having a first segmented line and a first complementary line, and having means for individually selectively coupling said lines to the stages of the upper rank of said register; said clock pulse segmenting circuit responding to a command signal and a clock pulse of said first series for segmenting said clock pulse, to provide on said first segmented line and said first complementary line, respectively, said clock pulse and the complement thereof; so as to set the stages in the upper rank to a state selected by the coupling between the respective stages of the upper rank and the first segmented line and the first complementary line.

14. The register defined in claim 13 wherein said clock pulse means further includes means for synchronously setting the ranks of said registers so that the lower rank stages provide enabling signals to their respective upper rank stages; whereby a first bit is stored in an upper rank stage which is energizable only by said clock pulse and a second bit is stored therein when the said upper rank stage is energizable by said clock pulse and the complement thereof.

15. The register defined in claim 14 wherein the upper rank of each stage includes a bistable element the output thereof representing the bit stored in the rank, the upper rank of each stage further including a three input terminal gating circuit having its output connected to the input of said bistable element, one of said input terminals being connected to the output of the lower rank of a preceding stage, another of said input terminals being connected to be energized by said clock pulse and said third input terminal being selectively energizable by one of said clock pulse and the complement thereof; whereby said bistable element is set to provide an output representing a first bit when said third input terminal is energized by said clock pulse and a second bit when said third input terminal is energized by the complement of said clock pulse.

16. A multistage shift register for shifting a bit stored in each stage to a succeeding stage comprising:
- a plurality of interconnected stages, each stage including at least a first and second rank, each rank having a plurality of inputs and means for storing either a first bit or a second bit;
- a source of clock pulses for providing a series of clock pulses of a first phase and a series of clock pulses of a second phase;
- first coupling means for energizing said first and second ranks of each stage with the first and second series of clock pulses respectively, to transfer the bit stored in each first rank to the second rank of the same stage in response to each clock pulse of said first series and to transfer the bit stored in each second rank to the first rank of the succeeding stage;
- clock pulse segmenting means disposed between said first coupling means and at least to one of the first and second ranks of said plurality of stages for segmenting one of the clock pulses supplied thereto into a segmented clock pulse and its complement; and
- second coupling means for energizing one input of the particular rank of each stage with said segmented clock pulse and another input with a selected one of said segmented clock pulse and its complement; whereby the particular ranks of the plurality of stages store a predetermined multibit number.

17. The shift register of claim 16 wherein each stage comprises an upper rank and a lower rank, each lower rank being provided with the clock pulses of said second series to transfer the bit stored therein to the upper rank of the succeeding stage in response to each clock pulse, and means for providing a command pulse to said clock pulse segmenting means disposed between said first coupling means and the upper ranks of said plurality of stages for segmenting one clock pulse of said first series into a segmented clock pulse, identical with said one clock pulse, and its complement to selectively energize each lower rank of each stage with said segmented clock pulse, and with a selected one of said segmented clock pulse and its complement.

18. The shift register of claim 17 wherein each rank comprises of three integrated circuit type field effect transistors and said first and second coupling means comprising deposited metallic layers in electrical contact with said transistors.

19. In combination with a multirank multistage shift register responsive to a source of clock pulse signals, data signals and command signals:
- control means coupled to at least one rank of said shift register and responding to said clock pulse signals, data signals and command signals for synchronously setting the ranks of said register so that all stages of the same rank are set to the same state; and
- segmenting means, including at least a first circuit having a first segmented line and a first complementary line, said lines being selectively coupled to the stages of a first rank of said register, said first circuit responding to command signals and first clock pulse signals, for segmenting the first clock pulse signals to provide on said first segmented line and said first complementary line, respectively, the first clock pulse signal and the complement thereof, so as to set the stages in the first rank to states selected by the coupling between the respective stages and the first segmented line and the first complementary line.

20. The combination of claim 19 with said shift register being a dual rank binary shift register and wherein:
- said segmenting means further includes a second circuit having a second segmented line and a second complementary line, said second lines being selectively coupled to the stages of a second rank of said register, said second circuit responding to said command signals and to second clock pulse signals for segmenting the second clock pulse signal to provide on said second segmented line and said second complementary line, respectively, the second clock pulse signal and the complement thereof, so as to set the stages in the second rank to states selected by the coupling between the respective stages of the second rank and said second segmented line and said second complementary line.

21. The combination of claim 19 with said shift register being a dual rank binary shift register and each stage of a first rank thereof having at least a first and second input circuit and each stage of a second rank having at least a first input circuit and the first stage of the second rank having a second input circuit, wherein:
- said first segmented line is coupled to the first input circuit of each stage of the first rank of said shift register;
- and further comprising connection means for individually coupling a selected one of said first segmented line and said first complementary line to said second input circuit of each stage of the first rank; and
- said control means having a first output circuit coupled to the first input circuit of each stage of the second rank of the shift register and a second output circuit coupled to the second input circuit of a first stage of the second rank of the shift register.

22. The combination of claim 20 with each stage of the shift register having first and second input circuits and a first stage of the second rank having a third input circuit wherein:
- said first segmented line is coupled to the first input circuit of each stage of the first rank of said shift register;
- said second segmented line is coupled to the first input circuit of each stage of the second rank of said shift register;
- said control means has an output circuit coupled to the third input circuit of the first stage of the second rank of said shift register;
- and further comprising first connection means for individually coupling a selected one of said first segmented line and said first complementary line to said second input circuit of each stage of the first rank; and second connection means for individually coupling a selected one of said second segmented line and said second complementary line to said second input of each stage of the second rank;
- whereby data shift serially in the register in the absence of the command signals, and each stage of said first rank is set to a state selected by its respective first connection means in response to the command signals and each stage of said second rank is set to a state selected by its respective second connection means in response to the command signals.

References Cited

UNITED STATES PATENTS

| | | | |
|---|---|---|---|
| 3,041,476 | 6/1962 | Parker | 307—88.5 |
| 3,050,714 | 8/1962 | Campbell | 328—37 XR |
| 3,127,525 | 3/1964 | Rabinovici | 307—88.5 |
| 3,137,845 | 6/1964 | Snyder | 340—174 |
| 3,174,106 | 3/1965 | Urban | 328—37 |

ARTHUR GAUSS, *Primary Examiner.*

S. D. MILLER, *Assistant Examiner.*

U.S. Cl. X.R.

328—92; 307—221, 224, 215, 279, 303, 304

UNITED STATES PATENT OFFICE
CERTIFICATE OF CORRECTION

Patent No. 3,421,092 January 7, 1969

Robert W. Bower et al.

It is certified that error appears in the above identified patent and that said Letters Patent are hereby corrected as shown below:

Column 3, line 22, "duel" should read -- dual --. Column 5, line 24, "Thereatfer" should read -- Thereafter --; line 43, "$Q_m^{[p]}$" should read -- $Q_n^{[p]}$ --. Column 9, line 46, "46" should read -- 45 --. Column 10, line 64, "such a" should read -- such as --. Column 11, line 28, "18" should read -- 78 --. Column 18, after line 57, insert claims 23 and 24:

23. The shift register of claim 16 wherein each rank comprises of a plurality of integrated circuit type transistors and said first and second coupling means comprising deposited metallic layers in electrical contact with said transistors.

24. The shift register of claim 23 wherein each stage comprises a plurality of field effect transistors.

In the heading to the printed specification, line 7, "22 Claims" should read -- 24 Claims --.

Signed and sealed this 7th day of April 1970.

(SEAL)
Attest:

EDWARD M.FLETCHER,JR.
Attesting Officer

WILLIAM E. SCHUYLER, JR.
Commissioner of Patents